United States Patent [19]

Steiger et al.

[11] 4,205,847
[45] Jun. 3, 1980

[54] TARGET VIDEO GAME AVOIDING ERRONEOUS COUNTS

[75] Inventors: Klaus Steiger, Unterrodach; Peter Wahl, Coburg, both of Fed. Rep. of Germany

[73] Assignee: Loewe-Opta GmbH, Fed. Rep. of Germany

[21] Appl. No.: 854,228

[22] Filed: Nov. 23, 1977

[30] Foreign Application Priority Data

Nov. 23, 1976 [DE]  Fed. Rep. of Germany ....... 2653093

[51] Int. Cl.² ............................................. A63F 9/02
[52] U.S. Cl. ............................ 273/313; 273/DIG. 28
[58] Field of Search ................. 273/85 G, 1 E, 101.1, 273/101.2, DIG. 28; 358/142, 93

[56] References Cited

U.S. PATENT DOCUMENTS

| 3,151,248 | 9/1964 | Glaser et al. | 273/DIG. 28 |
|---|---|---|---|
| 3,189,889 | 6/1965 | Bridgett | 340/324 A |
| 3,599,221 | 8/1971 | Baer | 35/9 R X |
| 3,728,480 | 4/1973 | Baer | 273/101.2 |
| 3,811,204 | 5/1974 | Marshall et al. | 273/101.1 X |
| 3,921,161 | 11/1975 | Baer | 273/85 G |
| 3,993,861 | 11/1976 | Baer | 358/142 |
| 4,111,421 | 9/1978 | Mierzwinski | 273/DIG. 28 |

OTHER PUBLICATIONS

*Electronics*, "Games," Jun. 24, 1976, pp. 89–96.
*Elektor*, "Score on Screen for TV Games," Oct., 1976, pp. 1008–1012.
*Elektor*, "Digits on TV," Oct., 1976, pp. 1034–1039.

*Primary Examiner*—Vance Y. Hum

[57] ABSTRACT

A target videogame employing a screen with a moving light spot symbol and a target detector. A frequency selective circuit is provided for selecting the electrical signals generated by the light entering a photosensor in the target detector according to their frequency relationship with respect to the line scanning and frame scanning frequency.

7 Claims, 4 Drawing Figures

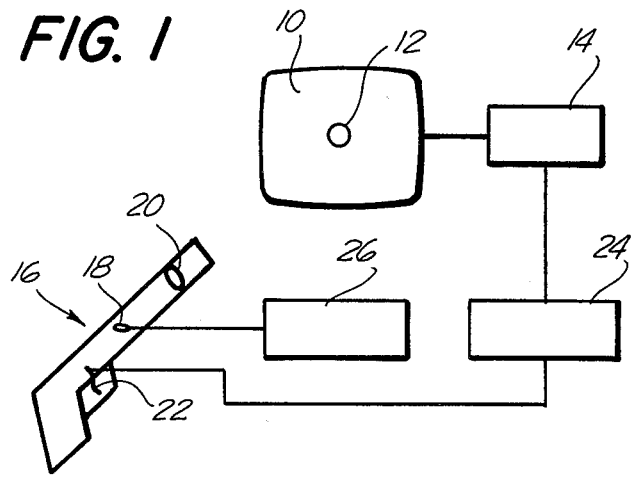
FIG. 1
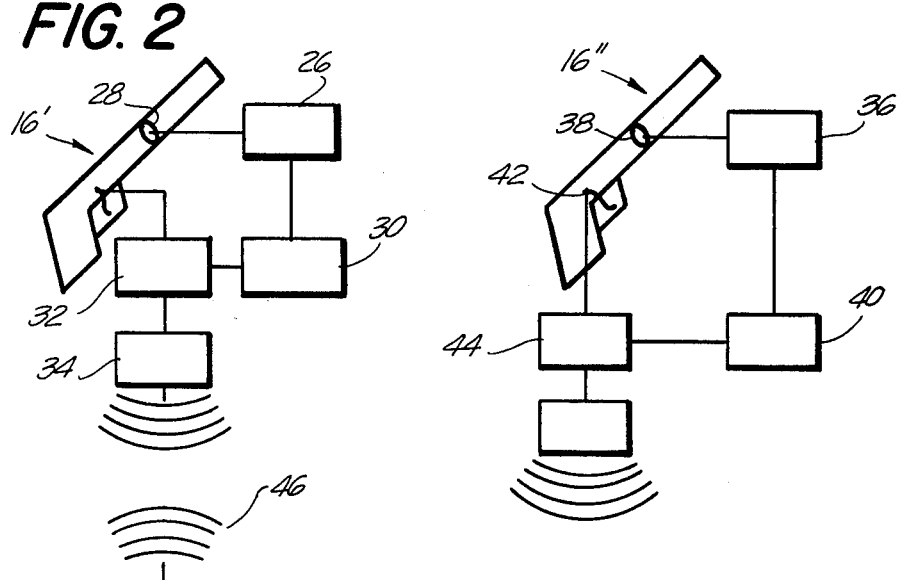
FIG. 2
FIG. 3
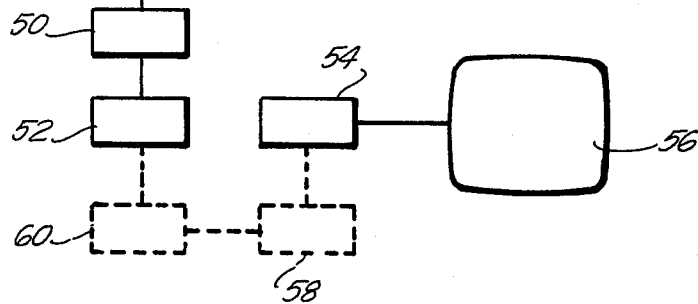
FIG. 4

TARGET VIDEO GAME AVOIDING ERRONEOUS COUNTS

CROSS-REFERENCE TO RELATED APPLICATION

This application is filed concurrently with our application (same invention entity and coassigned to the same assignee) Ser. No. 854,229, filed Nov. 23, 1977, in which the circuitry for generating and displaying the light spot symbol is described.

BACKGROUND OF THE INVENTION

1. Field of the Invention

A toy involving a moving light spot on a screen and a target detector with a trigger to be directed to the moving spot.

2. Description of the Prior Art

In videogames it is known to provide a moving light spot on a screen which can be shot down with a target detector in the shape of a gun or a rifle and incorporating a photosensor. A hit is achieved when the light from the spot enters the optical system of the target detector and induces first electrical signal in a photosensor such as a photoconductive cell, and when simultaneously the trigger arm is discharged and turns a switch for generating a second electrical signal. Usually the output signals from the target detector are transmitted through a cable to an evaluation circuit of the television set for counting the hits and missing shots and displaying same.

In some television sets an adapter stage can be connected to the television set through a separate connector socket or through the antenna jack for providing the signal conversion, counting and extinguishing of the moving light spot. Such target detectors with a photosensor have been found to be susceptible to interference through extrinsic light sources, e.g. through daylight or lamps fed by 60 hz alternating current according to the line voltage available. Due to this extrinsic light source hits may be counted even though the moving light spot does not completely coincide with the shooting direction of the target detector with the photosensor.

SUMMARY OF THE INVENTION

1. Purposes of the Invention

It is an object of the invention to provide a videogame with target shooting which has an extrinsic light signal suppression in the circuitry of the videogame.

It is another object of the invention to restrict hit counting to situations where only the light from the moving spot enters the optical system of the target detector.

These and other objects and advantages of the present invention will become evident from the description which follows.

2. Brief Description of the Invention

The present invention provides a video game which comprises a circuit for generating light spot symbols on a line scanned screen of a television receiver and a target detector which can be directed toward the light spot symbol moving on the screen.

The target detector incorporates an optical sensor which receives light energy emitted from the light spot on the screen.

A trigger arm is built on the target detector for actuating a switch which controls signals to be sent to the television display set through cables or wireless transmission. These signals are counted in electronic counters for registering a hit if the time cycle coincides for actuating the trigger arm and for the pulse resulting from conversion of the light impinging on the photosensor, and for registering a missing shot corresponding to actuation of the trigger arm. When a hit occurs the moving light spot on the screen extinguishes automatically. The moving light spot is modulated with the line scanning and frame scanning frequency. A frequency selective circuit selects the electrical signals generated by the light received in the photosensor of the target detector when the direction of the target detector coincides with the moving light spot symbol such that only pulses of the light spot symbol with the frequency of the line or frame scanning are fed to the evaluation circuits.

The invention accordingly consists in the features of construction, combination of elements and arrangements of parts which will be exemplified in the device hereinafter described and of which the scope of application will be indicated in the appended claims.

BRIEF DESCRIPTION OF THE DRAWINGS

In the accompanying drawing in which are shown several of the various possible embodiments of the invention:

FIG. 1 is a view of a block diagram of the videogame;

FIG. 2 is a view of a block diagram of the invention incorporating a coincidence circuit for triggering and light reception;

FIG. 3 is a view of a block diagram of the videogame wherein the trigger switch is connected to a modulator; and FIG. 4 is a view of a block diagram of the invention with preferred counting and display circuitry.

DETAILED DESCRIPTION OF THE PREFERRED EMBODIMENTS

Referring now to FIG. 1 a screen 10 of a television set displays a moving light spot symbol 12. The moving light spot symbol is generated by a control and amplifying circuit 14. A target detector 16 is provided which can be directed toward the moving light spot symbol on the screen. The target detector 16 can have various forms, which are suitable for aiming at a spot, such as a gun, a rifle, bow and arrow, telescope, etc. The target detector 16 incorporates an optical sensor 18 which receives light energy emitted from the moving light spot. The optical sensor can be a photosensor such as a photodiode, a photovoltaic detector, a photoconductive detector, a phototube and the like.

Optionally the target detector 16 can contain an optical system 20 which focuses the light received onto the optical sensor. The target detector 16 includes a trigger arm 22. Such a trigger arm includes a trigger lever, a trigger knob, a trigger push button and the like. The trigger arm actuation of the trigger arm releases a switch which generates an electrical signal. Such signals are transmitted to a counting circuit 24 through cables or by wireless transmission. A frequency selective circuit 26 selects the electrical signals generated by the light received by the optical sensor of the target detector when the direction of the target detector corresponds with the position of the moving light spot symbol on the screen such that only pulses resulting from the light spot symbol with the frequency of the line or frame scanning are fed to the counter circuit 24.

In the electronic counter 24 a hit is registered if the time cycle coincides for actuating the trigger arm and for the pulse resulting from conversion of the light impinging on the optical sensor. For registering a missing shot a pulse is generated based on the corresponding actuation of the trigger arm only and such pulse is transmitted to the counting circuit. When a hit occurs a signal is fed to the control and amplifier circuits 14 and the light spot extinguishes automatically.

Referring now to FIG. 2 there is shown a target detector 16' with a modified signal circuit. A demodulator 26 is fed with the line scanning frequency selected signals from the photosensor 28. A switching stage 30 is controlled by the demodulator 26 and receives signals with frame scanning frequency. A coincidence stage 32 compares the signal from the switching stage with a pulse resulting from the discharge of the trigger arm and its associated switch and provides signals to be emitted by a transmitting stage 34.

Referring now to FIG. 3 there is shown another embodiment of the circuitry relating to the target detector. A demodulator 36 is fed with the line frequency selected signals from the photosensor 38. A switching stage 40 is controlled by the demodulator 36 and receives pulses with frame scanning frequency. The trigger arm switch 42 is connected to a modulator 44 providing either scanning line or frame scanning frequency modulated signals depending on the time of triggering when simultaneously a signal from switching stage 40 is present and providing a continuous signal during the time of actuation of the trigger when no selected signal from the photosensor 38 is generated. An output stage can be provided for signals originating with the target detector 16".

Referring now to FIG. 4 there is shown a block diagram relating to the circuitry for the signals received from the target detector or its output stage by cable or by wireless transmission. The incoming signals 46 can be received by an input stage 48 and amplified by an amplifier 50. A pulse convertor 52 generates a pulse of a first time duration for an incoming modulated signal and of a second time duration different from the first duration for an incoming unmodulated signal. The signal is then fed to counting and display stages for displaying the occurances of hits and missing shots on the screen 56.

Optionally integration stages 58 may be included which have different time constants and to which the pulses coming from the pulse converter are fed. The integrating stages provide an electrical control signal to the counting and display stages 54 for counting and displaying hits and missing shots. Between the pulse converter and the integration stages may be inserted a monoflop circuit 60.

Preferably the integration stage for storing the pulse corresponding to the modulated signal comprises an input monoflop circuit 60 with such a small time element suitable for preventing the pulse derived from the unmodulated signal from being stored in the integrator.

These circuits are suitable for all of the above mentioned videogame circuits i.e. also in cases where the evaluation signals are transmitted through cables or wireless transmission to the counter and game circuitry controlling the screen display.

It thus will be seen that there is provided a device which achieves the various objects of the invention and which is well adapted to meet the conditions of practical use.

As various possible embodiments might be made of the above invention, and as various changes might be made in the embodiment set forth above, it is to be understood that all matter herein described or shown in the accompanying drawing is to be interpreted as illustrative and not in a limiting sense.

What is claimed is:

1. A videogame including a line and frame scanned television receiver comprising:
    a circuit for generating a light spot symbol on a line-scanned screen of a television receiver;
    a target detector directable to the light spot symbol moving on the screen;
    a photosensor incorporated in the target detector for receiving light energy emitted from the light spot on the screen;
    a trigger arm attached to the target detector for actuating a switch which controls signals to be sent to the television display set through cables or wireless transmission;
    an output stage of the target detector for sending signals which are modulated by the frequency selected light pulses for a hit of the target and which are unmodulated for a direction missing shot;
    an input stage for receiving the signals sent by the output stage;
    an amplification stage for amplifying the signals received from the input stage;
    a pulse converter stage connected to the amplification stage for generating a pulse of a first duration for an incoming modulated signal and for generating a pulse of a second duration different from the first duration for an incoming unmodulated signal;
    integration stages with different time constants to which the pulses from the pulse converter are fed for providing a control signal when the pulses surpass a defined threshold;
    and counting and display stages for receiving control signals from the integration stages and for counting and displaying the occurrences of hits and shots wherein said counting stage comprises electronic counters including evaluation circuits for counting these signals for registering a hit if the time cycle coincides for actuating the trigger arm of the target detector and for the pulse resulting from conversion of the light impinging on the photosensor and for registering a shot corresponding to actuation of the trigger arm and which causes the moving light spot on the screen to extinguish automatically when a hit occurs, said moving light spot being modulated with the line scanning and frame frequency; and
    a frequency selective circuit for selecting and evaluating the electrical signals generated by the light received in the photosensor of the target detector when the direction of the target detector coincides with the moving light spot symbol such that only pulses of the light spot symbol with the frequency of the line or frame scanning are transmitted to the evaluation circuits.

2. The videogame according to claim 1 comprising:
    a demodulator which is fed with the line scanning frequency selected signals from the photosensor;
    a switching stage controlled by the demodulator and receiving pulses with frame scanning frequency; and
    a coincidence stage for comparing the signal from the switching stage with the pulse resulting from the actuation of the trigger arm and the following switch and providing signals to be emitted by a transmitting stage.

3. The videogame according to claim 1 comprising:
a demodulator which is fed with the line scanning frequency selected signals from the photosensor;
a switching stage controlled by the demodulator and receiving pulses with frame frequency; and
a modulator connected to the trigger arm switch which modulator provides either scanning line frequency or frame frequency modulated signals depending on the time of triggering or which provides a continuous signal during the time of actuation of the trigger if a selected signal from the photosensor is not present.

4. The videogame according to claim 1, wherein the integration stage for storing the impulses corresponding to the modulated signal comprises an input monoflop circuit which is provided with such a small time element suitable for preventing the pulse derived from the unmodulated signal from being stored in the integrators.

5. The videogame according to claim 1, wherein the target detector is shaped like a gun.

6. The videogame according to claim 1, wherein the target detector is shaped like a rifle.

7. The videogame according to claim 1, wherein the photosensor is a photodiode.

* * * * *